United States Patent
Vineet et al.

(10) Patent No.: US 12,299,384 B2
(45) Date of Patent: May 13, 2025

(54) DIFFERENCE CAPTIONING ON PRODUCTIVITY APPLICATIONS FOR LOW VISION USERS

(71) Applicant: Microsoft Technology Licensing, LLC, Redmond, WA (US)

(72) Inventors: Vibhav Vineet, Bellevue, WA (US); Michael J. Bentley, Bellevue, WA (US); Sameera Lanka, Redmond, WA (US); Weiyao Xie, Redmond, WA (US); Yash Jain, Atlanta, GA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/153,781

(22) Filed: Jan. 12, 2023

(65) Prior Publication Data
US 2024/0242019 A1    Jul. 18, 2024

(51) Int. Cl.
G06F 40/169    (2020.01)
G06N 20/00     (2019.01)

(52) U.S. Cl.
CPC ........... *G06F 40/169* (2020.01); *G06N 20/00* (2019.01)

(58) Field of Classification Search
CPC .............................. G06F 40/169; G06N 20/00
See application file for complete search history.

(56) References Cited

U.S. PATENT DOCUMENTS

2022/0382728 A1* 12/2022 Religa .................. G06F 40/197
2023/0377363 A1* 11/2023 Sun ...................... G06V 40/107

OTHER PUBLICATIONS

"Microsoft PowerPoint Designer", Retrieved From: https://web.archive.org/web/20220604044028/https://support.microsoft.com/en-us/office/create-professional-slide-layouts-with-designer-53c77d7b-dc40-45c2-b684-81415eac0617, Jun. 4, 2022, 7 Pages.
"Blindness Statistics—National Federation of the Blind", Retrieved From: https://nfb.org/resources/blindness-statistics?q=resources%2Fblindness-statistics, Jan. 2019, 8 Pages.
Anderson, et al., "Bottom-Up and Top-Down Attention for Image Captioning and Visual Question Answering", In Proceedings of the IEEE conference on computer vision and pattern recognition, Jun. 18, 2018, pp. 6077-6086.
Anderson, et al., "SPICE: Semantic Propositional Image Caption Evaluation", In Proceedings of the European Conference on Computer Vision, Oct. 11, 2016, 17 Pages.

(Continued)

*Primary Examiner* — Asher D Kells

(57) ABSTRACT

A computing device may receive a plurality of sample slides with various layouts, receive a plurality of augmentations, select one or more augmentations from the plurality of augmentations that are compatible with each other, apply the selected augmentations to the plurality of sample slides to create a plurality of perturbed slides, generate a plurality of slide pairs by combining the plurality of sample slides and the plurality of perturbed slides, filter one or more slide pairs of the plurality of slide pairs that are visually the same, generate the synthetic design dataset including the filtered slide pairs and one or more classes of perturbation that are associated with each of the filtered slide pairs, and train a predictive model using synthetic design dataset for predicting one or more predicted augmentations indicative of one or more layout differences between a pair of slides.

16 Claims, 10 Drawing Sheets

(56) References Cited

OTHER PUBLICATIONS

Brown, et al., "Language Models are Few-Shot Learners", In Journal of Advances in neural information processing systems, vol. 33, Dec. 6, 2020, 25 Pages.

Chen,, et al., "Microsoft COCO Captions: Data Collection and Evaluation Server", In repository of arXiv:1504.00325v2, Apr. 3, 2015, 7 Pages.

Denkowski, et al., "Meteor Universal: Language Specific Translation Evaluation for Any Target Language", In Proceedings of the Ninth Workshop on Statistical Machine Translation, Jun. 26, 2014, pp. 376-380.

Forbes, et al., "Neural Naturalist: Generating Fine-Grained Image Comparisons", In repository of arXiv:1909.04101v3, Nov. 14, 2019, 14 Pages.

Guo, et al., "CLIP4IDC: CLIP for Image Difference Captioning", In repository of arXiv:2206.00629, Oct. 18, 2022, 10 Pages.

Gurari, et al., "Captioning images taken by people who are blind", In Proceedings of European Conference on Computer Vision, Springer, Nov. 19, 2020, pp. 417-434.

Hosseinzadeh, et al., "Image Change Captioning by Learning from an Auxiliary Task", In Proceedings of the IEEE/CVF Conference on Computer Vision and Pattern Recognition, Jun. 20, 2021, pp. 2725-2734.

Huang, et al., "Image Difference Captioning With Instance-Level Fine-Grained Feature Representation", In Journal of IEEE Transactions on Multimedia, vol. 24, Apr. 21, 2021, pp. 2004-2017.

Jhamtani, et al., "Learning to Describe Differences Between Pairs of Similar Images", In repository of arXiv:1808.10584v1, Aug. 31, 2018, 11 Pages.

Kim, et al., "Agnostic Change Captioning with Cycle Consistency", In Proceedings of the IEEE/CVF International Conference on Computer Vision, Oct. 10, 2021, pp. 2095-2104.

Krojer, et al., "Image Retrieval from Contextual Descriptions", In repository of arXiv:2203.15867v1, Mar. 29, 2022, 15 Pages.

Papineni, et al., "BLEU: a Method for Automatic Evaluation of Machine Translation", In Proceedings of the 40th annual meeting of the Association for Computational Linguistics, Jul. 6, 2002, pp. 311-318.

Park, et al., "Robust Change Captioning", In Proceedings of the IEEE/CVF International Conference on Computer Vision, Oct. 27, 2019, pp. 4624-4633.

Rennie, et al., "Self-Critical Sequence Training for Image Captioning", In Proceedings of the IEEE conference on computer vision and pattern recognition, Jul. 21, 2017, pp. 7008-7024.

Shi, et al., "Finding It at Another Side: A Viewpoint-Adapted Matching Encoder for Change Captioning", In Proceedings of European Conference on Computer Vision, Springer, Nov. 13, 2020, pp. 574-590.

Sun, et al., "Bidirectional Difference Locating and Semantic Consistency Reasoning for Change Captioning", In Journal of International Journal of Intelligent Systems, vol. 37, Issue 5, Jan. 19, 2022, pp. 2969-2987.

Tu, et al., "R 3Net:Relation-embedded Representation Reconstruction Network for Change Captioning", In Proceedings of Empirical Methods in Natural Language Processing, Nov. 7, 2021, pp. 9319-9329.

Vedantam, et al., "Cider: Consensus-based image description evaluation", In Proceedings of the IEEE conference on computer vision and pattern recognition, Jun. 7, 2015, pp. 4566-4575.

Vinyals, et al., "Show and Tell: A Neural Image Caption Generator", In Proceedings of the IEEE conference on computer vision and pattern recognition, Jun. 7, 2015, pp. 3156-3164.

Xu, et al., "Show, Attend and Tell: Neural Image Caption Generation with Visual Attention", In Proceedings of International conference on machine learning, Jul. 6, 2015, 10 Pages.

Yao, et al., "Image Difference Captioning with Pre-training and Contrastive Learning", In repository of arXiv:2202.04298v1, Feb. 9, 2022, 13 Pages.

Anonymous: "Track changes in your presentation—Microsoft Support", Retrieve from: https://support.microsoft.com/en-us/office/track-changes-in-your-presentation-35dad781-50f7-4c4f-9b15-cf418f03c279, Jun. 1, 2021, pp. 1-7.

International Search Report and Written Opinion received for PCT Application No. PCT/US24/10100, Apr. 29, 2024, 14 pages.

Xu, et al., "Tell-the-difference: Fine-grained Visual Descriptor via a Discriminating Referee", retrieve from: arXiv preprint arXiv:1910.06426, Oct. 14, 2019, pp. 1-28.

\* cited by examiner

DIFFERENCE CAPTIONING ON PRODUCTIVITY APPLICATIONS FOR LOW VISION USERS

BACKGROUND

Productivity applications have become a powerful tool to create and share ideas with others. It is used by people around the world to spread knowledge in a visual-textual manner. Moreover, users put in a lot of effort to present the content on the slide that will help them to convey their ideas effectively and provide immersive experience for the audience. The content presentation on the slides could involve making decisions about background selection, placements of titles, texts, images, and their sizes. Selection of right design from such large number of choices may become a challenge for the users. Thus, some productivity applications have design tools to help the users to improve quality of slides by suggesting placements of text boxes and images, changes in font-size, alignments of text and images, or addition of various shapes to the slides. Though this is a remarkable tool, use of the tool is generally limited to the users who can see the designs proposed by the tool. There are a large number of people with low or impaired vision who may find it difficult to use such tools.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

The present disclosure relates to a design difference captioning tool that generates design difference captions, which describes layout differences between a pair of designed slides. More particularly, the present disclosure teaches the ability to detect subtle differences between a pair of design slides and generate design difference captions in concise natural language.

In accordance with at least one example of the present disclosure, a method for generating a design difference caption is provided. The method may include receiving, by a productivity application, a first slide with a first layout, identifying a first set of elements included in the first layout, determining first characteristics associated with the first set of elements, receiving a second slide with a second layout, identifying a second set of elements included in the second layout, determining second characteristics associated with the second set of elements, determining, using a predictive model, one or more predicted augmentations indicative of one or more layout differences between the first slide and the second slide based on the first characteristics and the second characteristics, generating, using a generative machine learning model, a design difference caption based on the one or more predicted augmentations and one or more annotated templates, the design difference caption including a description of one or more layout differences between the first slide and the second slide, the one or more annotated templates including annotations for the one or more predicted augmentation, and providing, by the productivity application, the design difference caption.

In accordance with at least one example of the present disclosure, a computing device for generating a design difference caption is provided. The computing device may include a processor and a memory having a plurality of instructions stored thereon that, when executed by the processor, causes the computing device to receive a plurality of sample slides with various layouts, receive a plurality of augmentations, each of the plurality of augmentations indicative of a class of perturbation applicable to the plurality of sample slides, select one or more augmentations from the plurality of augmentations that are compatible with each other, apply the selected augmentations to the plurality of sample slides to create a plurality of perturbed slides, generate a plurality of slide pairs by combining the plurality of sample slides and the plurality of perturbed slides, filter one or more slide pairs of the plurality of slide pairs that are visually the same, generate or update the synthetic design dataset including the filtered slide pairs and one or more classes of perturbation that are associated with each of the filtered slide pairs, and train a predictive model as multi-label classification using synthetic design dataset for predicting one or more predicted augmentations, the one or more predicted augmentations indicative of one or more layout differences between a pair of slides.

In accordance with at least one example of the present disclosure, a non-transitory computer-readable medium storing instructions for generating a design difference caption, the instructions when executed by one or more processors of a computing device, cause the computing device to receive a first document, identify a first set of elements included in the first layout, determine first characteristics associated with the first set of elements, receive a second document with a second layout, identify a second set of elements included in the second layout, determine second characteristics associated with the second set of elements, generate, using a predictive model, one or more predicted augmentations indicative of one or more layout differences between the first document and the second document based on the first characteristics and the second characteristics, generate, using a generative machine learning model, a design difference caption based on the one or more predicted augmentations and one or more annotated templates, the design difference caption including a description of one or more layout differences between the first document and the second document, the one or more annotated templates including annotations for the one or more predicted augmentation, and provide, by the productivity application, the design difference caption.

Any of the one or more above aspects in combination with any other of the one or more aspects. Any of the one or more aspects as described herein.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

DETAILED DESCRIPTION

Figure 1:
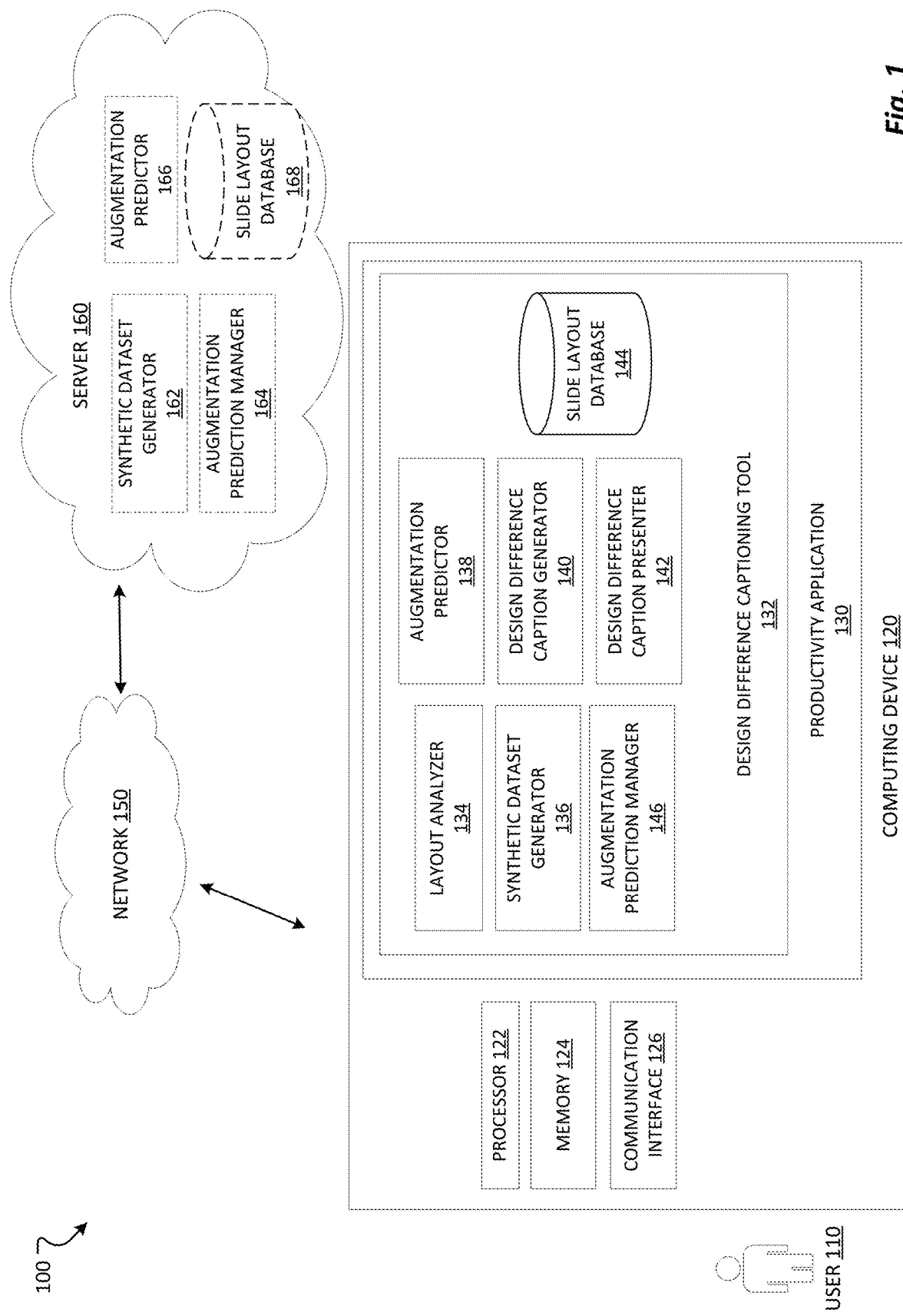
FIG. 1 depicts a block diagram of an example of an operating environment in which a design difference captioning tool may be implemented in accordance with examples of the present disclosure.

In the following detailed description, references are made to the accompanying drawings that form a part hereof, and in which are shown by way of illustrations specific aspects or examples. These aspects may be combined, other aspects may be utilized, and structural changes may be made without departing from the present disclosure. Aspects may be practiced as methods, systems or devices. Accordingly, aspects may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Productivity applications, such as Microsoft® PowerPoint®, have become a powerful tool to create and share ideas with others. It is used by people around the world to spread knowledge in a visual-textual manner. Moreover, users put in a lot of effort to present the content on the slide that will help them to convey their ideas effectively and provide immersive experience for the audience. The content presentation on the slides could involve making decisions about background selection, placements of titles, texts, images, and their sizes. Selection of right design from such large number of choices may become a challenge for the users. Thus, some productivity applications have design tools to help the users to improve quality of slides by suggesting placements of text boxes and images, changes in font-size, alignments of text and images, or addition of various shapes to the slides. Though this is a remarkable tool, use of the tool is generally limited to the users who can see the designs proposed by the tool. There are a large number of people with low vision or visually impaired who may find it difficult to use such tools.

In accordance with examples of the present disclosure, a productivity application provides a design difference captioning tool to allow users with low or impaired vision to utilize the design tool of the productivity application designed to help the users to improve quality of the design slide.

Some existing captioning tools may create a description of a slide if given labeled data. However, captioning and listening to the description of each designed slide generally leads to information dump on the user. For example, very often majority of the designed suggestions are very similar in design to one another so the descriptions are also very similar. Thus, generating descriptions for each of these slides would be very wordy for the user, especially someone using a screen reader. As such, instead of providing descriptions for each designed slide, the design difference captioning tool provides design difference captions that describe the difference between a pair of designed slides to deliver information concisely while being informative. These captions can be conveyed to the users in both text and/or speech formats.

To do so, the design difference captioning problem is framed within a deep learning framework. Training the design difference captioning tool consists of two parts: (1) a predictive model (e.g., an image encoder) that learns the subtle layout changes between a pair of designed slides followed by (2) a generative machine learning model (e.g., a textual decoder), which samples annotation for each class and rephrase them in a concise natural language caption so that it is easily comprehendible by the user. As such, the design difference captioning tool is configured to generate the design difference captions that concisely describe the difference between a pair of designed slides to be conveyed to the user.

It should be appreciated that although, for exemplarily purposes, described embodiments generally relate to productivity applications, and more particularly, presentation applications, the present methods and systems are not so limited. For example, the design difference captioning tool described herein may also provide design difference captioning for describing the differences between a pair of documents.

FIG. 1 depicts a block diagram of an example of an operating environment 100 in which a design difference captioning tool may be implemented in accordance with examples of the present disclosure. To do so, the operating environment 100 includes a computing device 120 associated with the user 110. The operating environment 100 may further include one or more remote devices, such as a server 160, that are communicatively coupled to the computing device 120 via a network 150. The network 150 may include any kind of computing network including, without limitation, a wired or wireless local area network (LAN), a wired or wireless wide area network (WAN), and/or the Internet.

The computing device 120 includes a productivity application 130 executing on a computing device 120 having a processor 122, a memory 124, and a communication interface 126. The productivity application 130 allows the user 110 to create and design a slide. For example, a designed slide is a single page of information in a presentation created in the productivity application, such as Microsoft® PowerPoint®. The productivity application 130 includes a design difference captioning tool 132 that is configured to generate design difference captions describing layout differences between a pair of designed slides. In the illustrative embodiment, the designed slide is processed as an image of a single page in a presentation. In other words, the design difference captioning tool 132 is capable of generating design difference captions describing layout differences between two images. It should be appreciated that, in some aspects, the design difference captioning tool 132 may generate design difference captions for documents that the user 110 created using a respective productivity application 130.

To do so, the productivity application 130 further includes a layout analyzer 134, a synthetic dataset generator 136, an augmentation prediction manager 146, an augmentation predictor 138, a design difference caption generator 140, and a design difference caption presenter 142.

The layout analyzer 134 is configured to analyze designed slides with various layouts to determine characteristics associated with the one or more elements included in the slide layouts. To do so, the layout analyzer 134 may receive a slide with a layout and identify a set of elements that are included in the slide layout. For example, the elements may include title and subtitle text boxes, and the slide layout may be defined by the shape, size, and presence or absence of the title and subtitle text boxes. Each text box is a section on the slide where a user can input textual information. It should be appreciated that the elements may further include a background image, solid shapes, diagrams, extra text boxes, or any other style elements on a slide. In some aspects, the layout may be a predefined slide template. For example, the productivity application 130 has a predefined set of slide layouts, called slide templates, and the slide templates may be stored in a slide layout database 144. Each slide template includes a predefined set of elements. In some aspects, each slide template includes predefined characteristics associated with the predefined set of elements. The layout analyzer 134 is further configured to determine characteristics associated with the set of elements in the slide layout. For examples, the characteristics associated with the set of elements may include location, size, color, and/or shape of each element on the slide. As described above and further below, the characteristics associated with the elements included in the slide layouts are used by the augmentation predictor 138 to determine layout differences between different layouts. In some aspects, the layout analyzer 134 may store the set of elements and the associated characteristics of the received slides in the slide layout database 144.

The synthetic dataset generator 136 is configured to generate synthetic design dataset that is used to train the augmentation predictor 138 for predicting augmentations that indicate layout differences between a pair of designed slides. To do so, the synthetic dataset generator 136 is configured to receive a plurality of sample slides with various layouts and receive a plurality of augmentations. For example, each of the plurality of augmentations is a class of perturbation that may be applied to the plurality of sample slides. Additionally, the synthetic dataset generator 136 is configured to select one or more augmentations from the plurality of augmentations that are compatible with each other. For example, the selected augmentations are considered to be compatible with one another if the perturbation made by a first augmentation is not affected by the perturbation made by a second augmentation. For example, Move Title top-right and Increase Title Font are compatible with one another because the title will be moved to the top-right of the slide and the font of the title will be increased after applying these selected augmentations. However, Move Title top-right and Swap Title and Body are incompatible because the title will not be positioned at the top-right of the slide after applying these selected augmentations.

The synthetic dataset generator 136 is further configured to apply the selected combinations of augmentations to each of the plurality of sample slides to create a plurality of perturbed slides. Additionally, the synthetic dataset generator 136 is configured to combine the plurality of sample slides and the plurality of perturbed slides to generate a plurality of slide pairs and filter one or more slide pairs of the plurality of slide pairs that are visually the same. It should be appreciated that not all combinations of the augmentations result in visually different slides. For example, a slide that has its title center aligned will show no change after undergoing Align Title center augmentation. The synthetic dataset generator 136 is further configured to generate the synthetic design dataset that includes the filtered slide pairs and one or more classes of augmentations that are associated with each of the filtered slide pairs.

The augmentation prediction manager 146 is configured to receive the synthetic design dataset and train the augmentation predictor 138 as multi-label classification using the synthetic design dataset. The augmentation prediction manager 146 is further configured to evaluate the trained augmentation predictor 138 to estimate accuracy in predicting one or more predicted augmentations.

The augmentation predictor 138 is configured to generate one or more predicted augmentations that indicate one or more layout differences between a pair of designed slides. For example, the augmentation predictor 138 may determine one or more elements that are common to the designed slide pair, evaluate the characteristics associated with the common elements presented on both slides, and generate or predict one or more predicted augmentations indicative of layout differences between the designed slide pair based on the characteristics associated with the common elements. It should be appreciated that, in the illustrative embodiment, the augmentation predictor 138 is embodied as any predictive model that uses one or more machine learning techniques to detect the differences between the pair of designed slides. For example, the augmentation predictor 138 is an image encoder. However, in some aspects, the augmentation predictor 138 may utilize a predictive model to perform its functions.

The design difference caption generator 140 is configured to generate design difference captions based on the predicted augmentations and annotated templates. As described above, the design difference captions include descriptions of one or more layout differences between a pair of designed slides, and the annotated templates include annotations for the one or more predicted augmentations. To do so, the design difference caption generator 140 is configured to generate an annotation for each predicted class of augmentation based on the annotated template associated with the respective predicted class of augmentation. The design difference caption generator 140 is further configured to combine the annotations and rephrase them into a concise natural language design difference caption. For example, suppose the augmentation predictor 138 predicted Move Title top-right and Align Title left augmentations, then the design difference caption generator 140 will sample annotated templates from each of these augmentation class as The title is moved to the top-right location and The title text is left-aligned. Both of these annotations will then be rephrased by the design difference caption generator 140 into a natural language caption, such as, The title is moved to top-right location while its text was aligned to the left. It should be appreciated that, in the illustrative embodiment, the design difference caption generator 140 is embodied as a generative machine learning model. For example, the design difference caption generator 140 is a textual decoder. However, in some aspects, the design difference caption generator 140 may utilize a generative machine learning model to perform its functions.

The design difference caption presenter 142 is configured to convey the design difference captions to the user 110. For example, the design difference caption presenter 142 may display the design difference captions on a graphical user interface in a text format. In some aspects, the design difference captions may be generated in an audio format to be played to the user 110.

Figure 2:
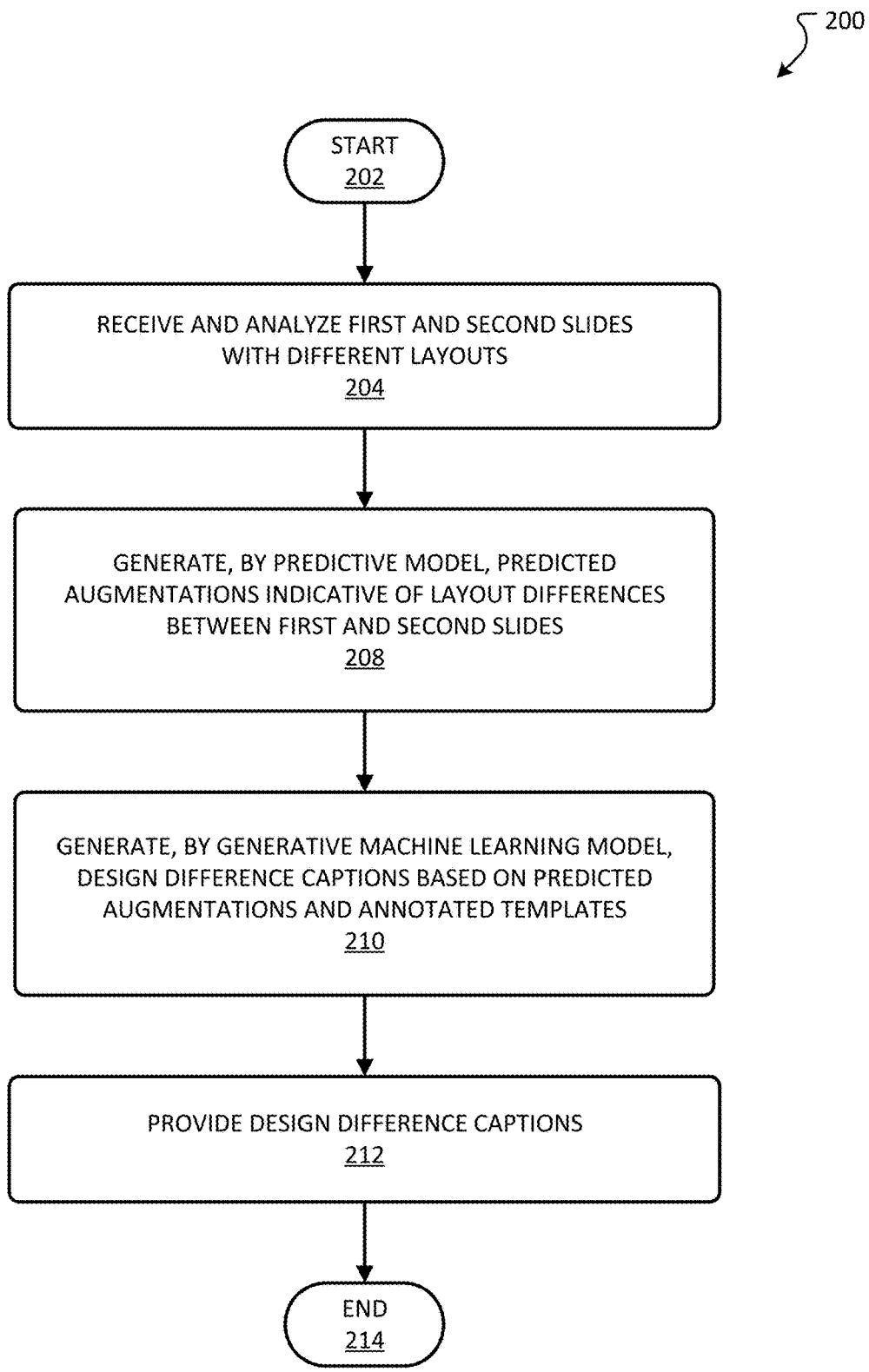
FIG. 2 depicts a flowchart of an example method of generating design difference captions that describes layout differences between a pair of slides in accordance with examples of the present disclosure.

Referring now to FIG. 2, a method 200 for generating design difference captions that describes one or more layout differences between a pair of slides in accordance with examples of the present disclosure is provided. A general order for the steps of the method 200 is shown in FIG. 2. Generally, the method 200 starts at 202 and ends at 214. The method 200 may include more or fewer steps or may arrange the order of the steps differently than those shown in FIG. 2. In the illustrative aspect, the method 200 is performed by a computing device (e.g., a user device 120) of a user 110. However, it should be appreciated that one or more steps of the method 200 may be performed by another device (e.g., a server 160).

Specifically, in some aspects, the method 200 may be performed by an productivity application (e.g., 130) executed on the user device 120. For example, the productivity application 130 may be Microsoft® PowerPoint® or any other productivity application executed on the computing device 120. More specifically, the method 200 may be performed by a design difference captioning tool (e.g., 132) of a productivity application (e.g., 130) executed on the user device 120. For example, the computing device 120 may be, but is not limited to, a computer, a notebook, a laptop, a mobile device, a smartphone, a tablet, wearable, or any other suitable computing device that is capable of executing a productivity application (e.g., 130). For example, the server 160 may be any suitable computing device that is capable of communicating with the computing device 120. The method 200 can be executed as a set of computer-executable instructions executed by a computer system and encoded or stored on a computer readable medium. Further, the method 200 can be performed by gates or circuits associated with a processor, Application Specific Integrated Circuit (ASIC), a field programmable gate array (FPGA), a system on chip (SOC), or other hardware device. Hereinafter, the method 200 shall be explained with reference to the systems, components, modules, software, data structures, user interfaces, etc. described in conjunction with FIG. 1 and FIGS. 7-9.

The method 200 starts at 202, where flow may proceed to 204. At 204, the productivity application 130 receives a first slide and a second slide with different slide layouts and analyzes the first and second slides. For example, a slide layout may be defined by the shape, size, and presence or absence of the title and subtitle text box.

Subsequently, at 208, the productivity application 130 generates predicted augmentations that indicate layout differences between the first slide and the second slide using a predictive model (e.g., an image encoder). To do so, the predictive model is configured to detect any changes in the slide layouts of the first and second slides and predict one or more augmentations associated with the detected changes. As described above, an augmentation is a class of perturbation on a slide. Some examples of the augmentation include change text alignment, move text boxes, change font size, and swap title and body. In other words, the predicted augmentations indicate layout differences that are likely to exist when comparing the first slide and the second slide. In some aspects, the predicted augmentations may include a predicted probability of the likelihood of the presence of one or more augmentations.

At 210, the productivity application 130 generates a design difference caption based on the predicted augmentations and annotated templates using a generative machine learning model (e.g., a textual decoder). The design difference caption includes a description of the layout differences between the first slide and the second slide. More specifically, the design difference caption is in natural language that provides a concise description of the layout differences between the first slide and the second slide. The annotated templates include annotations for the predicted augmentations. In some aspects, each of the annotated templates is associated with an augmentation and includes several different annotations for the corresponding augmentation. For example, the annotated templates may be generated by human and may include several different annotations for each augmentation. This allows the generative machine learning model to provide a concise description of the layout differences between the first slide and the second slide.

Subsequently, at 212, the productivity application 130 provides the design difference caption to the user 110. For example, the design difference caption may be displayed on a graphical user interface (e.g., 126) of the computing device 120 in a text format and/or provided in an audio format.

Figure 3:
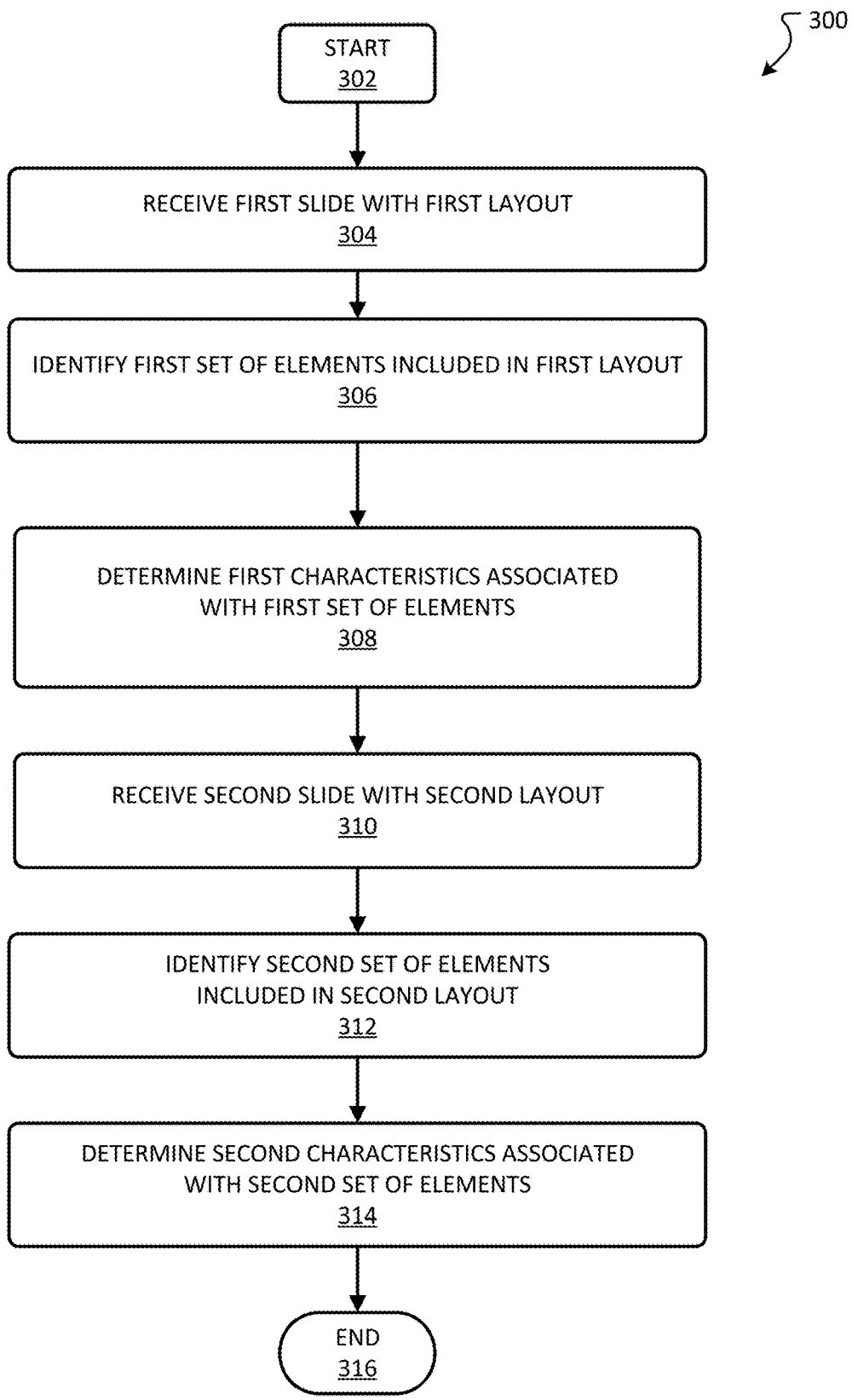
FIG. 3 depicts a flowchart of an example method of analyzing a pair of designed slides with different layouts in accordance with examples of the present disclosure.

Referring now to FIG. 3, a method 300 for analyzing a pair of designed slides with different layouts in accordance with examples of the present disclosure is provided. Generally, the method 300 illustrates a sequence of operations for receiving and analyzing the first and second slides 204 of FIG. 2. A general order for the steps of the method 300 is shown in FIG. 3. Generally, the method 300 starts at 302 and ends at 316. The method 300 may include more or fewer steps or may arrange the order of the steps differently than those shown in FIG. 3.

In the illustrative aspect, the method 300 is performed by a computing device (e.g., a user device 120) of a user 110. However, it should be appreciated that one or more steps of the method 300 may be performed by another device (e.g., a server 160). Specifically, in some aspects, the method 300 may be performed by a design difference captioning tool (e.g., 132) of an productivity application (e.g., 130). For example, the productivity application 130 may be Microsoft® PowerPoint® or any other productivity application executed on the computing device 120. More specifically, the method 300 may be performed by a layout analyzer (e.g., 134) of the design difference captioning tool 132. The method 300 can be executed as a set of computer-executable instructions executed by a computer system and encoded or stored on a computer readable medium. Further, the method 300 can be performed by gates or circuits associated with a processor, an ASIC, an FPGA, a SOC or other hardware device. Hereinafter, the method 300 shall be explained with reference to the systems, components, modules, software, data structures, user interfaces, etc. described in conjunction with FIG. 1 and FIGS. 7-9.

The method 300 starts at 302, where flow may proceed to 304. At 304, the layout analyzer 134 receives a first slide with a first layout. For example, a slide layout may be defined by the shape, size, and presence or absence of the title and subtitle text boxes.

Subsequently, at 306, the layout analyzer 134 identifies a first set of elements included in the first layout. For example, the elements include title and subtitle text boxes. Each text box is a section on the slide where a user can input textual information. It should be appreciated that the elements may further include a background image, solid shapes, diagrams, extra text boxes, or any other style elements on a slide. In some aspects, the first layout may be a predefined slide template. For example, the productivity application 130 has a predefined set of slide layouts, called slide templates, and the slide templates may be stored in a database (e.g., 144). Each slide template includes a predefined set of elements. In some aspects, each slide template includes predefined characteristics associated with the predefined set of elements.

At 308, the layout analyzer 134 determines first characteristics associated with the first set of elements. For example, the first characteristics associated with the first set of elements may include location, size, color, and/or shape of each element on the first slide.

Subsequently, at 310, the layout analyzer 134 receives a second slide with a second layout. However, it should be appreciated that, in some aspects, the second slide may be received simultaneously with the first slide. At 312, the layout analyzer 134 identifies a second set of elements included in the second layout. At 314, the layout analyzer 134 determines second characteristics associated with the second set of elements.

As described above in step 208 of FIG. 2, the predictive model is configured to detect any changes in the slide layouts of the first and second slides and predict one or more augmentations associated with the detected changes. More particularly, the predictive model is configured to detect any changes in common elements presented in both the first and second slides based on the first characteristics and the second characteristics associated with the first slide and the second slide, respectively. However, there is no available labeled dataset for training such predictive model. As such, a synthetic design dataset (SynD) is generated using a set of augmentations and sample designed slides in order to train the predictive model. Training and implementations of the predictive model is further described below in FIGS. 4A and 4B.

Figure 4A:
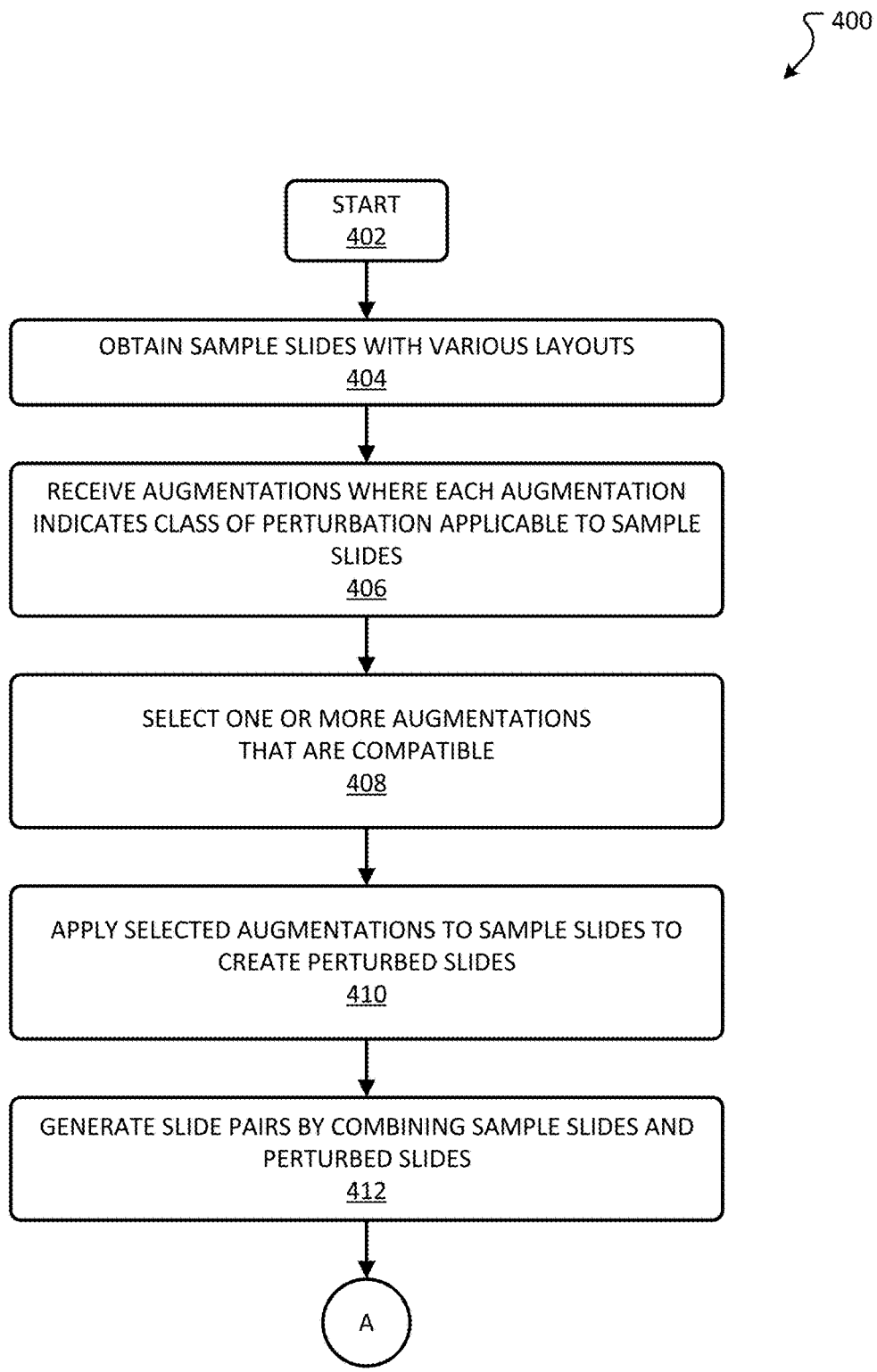
FIGS. 4A and 4B depict a flowchart of an example method of generating synthetic design dataset to train a predictive model for generating predicted augmentations indicative of layout differences between a pair of designed slides in accordance with examples of the present disclosure.
Figure 4B:
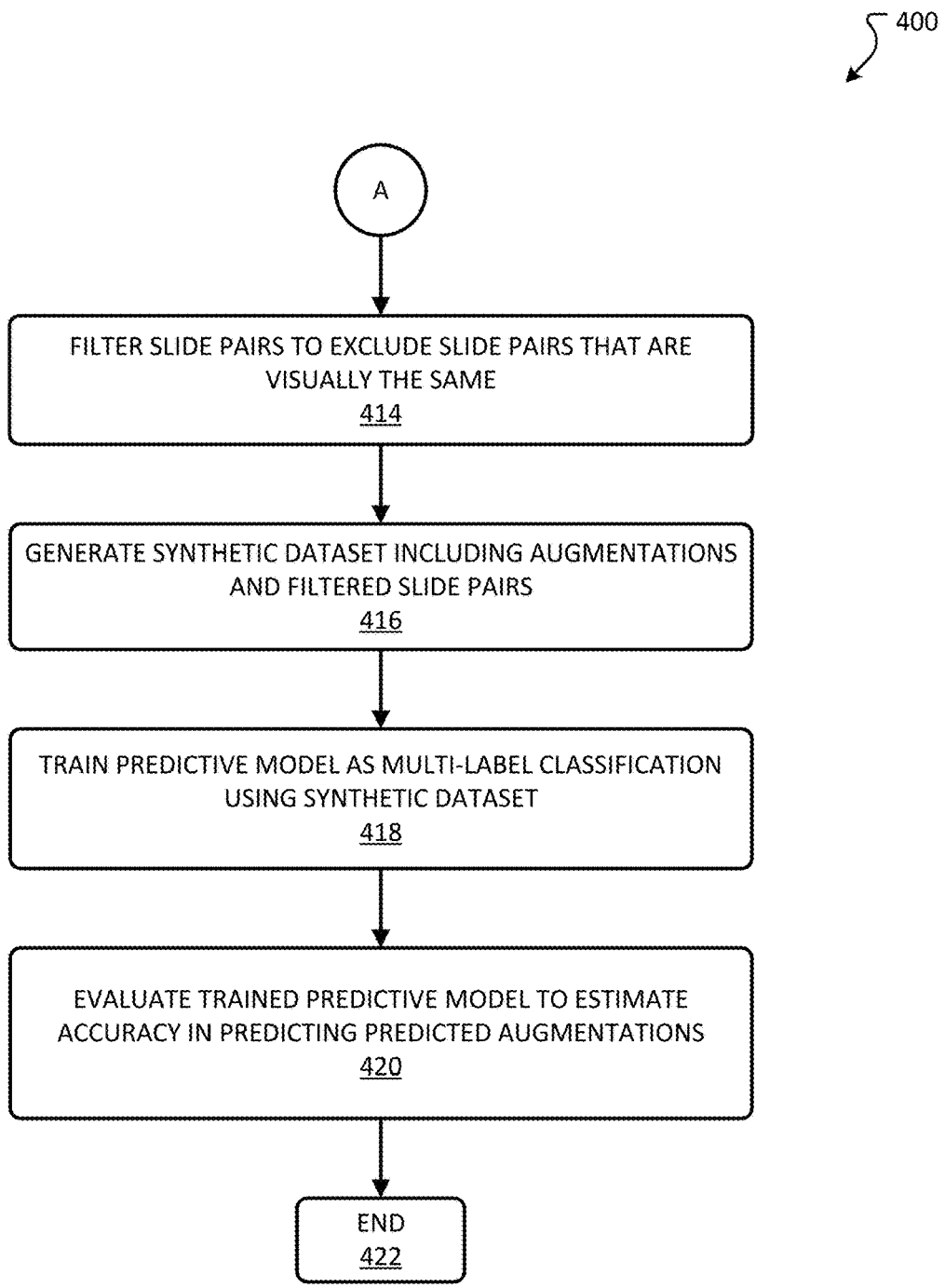

Referring now to FIGS. 4A and 4B, a method 400 for generating synthetic design dataset (SynD) to train a predictive model for generating one or more predicted augmentations indicative of one or more layout differences between a pair of designed slides in accordance with examples of the present disclosure is provided. A general order for the steps of the method 400 is shown in FIGS. 4A and 4B. Generally, the method 400 starts at 402 and ends at 422. The method 400 may include more or fewer steps or may arrange the order of the steps differently than those shown in FIGS. 4A and 4B.

In the illustrative aspect, the method 400 is performed by a computing device (e.g., a user device 120) of a user 110. However, it should be appreciated that one or more steps of the method 400 may be performed by another device (e.g., a server 160). Specifically, in some aspects, the method 400 may be performed by a design difference captioning tool (e.g., 132) of an productivity application (e.g., 130) executed on the user device 120. More specifically, steps 404-416 of the method 400 may be performed by a synthetic dataset generator (e.g., 136) of the design difference captioning tool 132 to generate synthetic design dataset, and steps 418 and 420 may be performed by an augmentation prediction manager (e.g., 146) of the design difference captioning tool 132. However, it should be appreciated that, in some aspects, the synthetic dataset generator (e.g., 162) and/or the augmentation prediction manager (e.g., 164) may be executed on another device (e.g., a server 160). In such embodiments, the trained predictive model may be deployed to the user device 120.

The method 400 can be executed as a set of computer-executable instructions executed by a computer system and encoded or stored on a computer readable medium. Further, the method 400 can be performed by gates or circuits associated with a processor, an ASIC, an FPGA, a SOC or other hardware device. Hereinafter, the method 400 shall be explained with reference to the systems, components, modules, software, data structures, user interfaces, etc. described in conjunction with FIG. 1 and FIGS. 7-9.

The method 400 starts at 402, where flow may proceed to 404. At 404, the design difference captioning tool 132 obtains sample slides with various layouts. Subsequently or simultaneously, at 406, the productivity application 130 obtains a plurality of augmentations. Each augmentation indicates a class of perturbation that can be applied to the sample slides.

At 408, the design difference captioning tool 132 selects one or more augmentation that are compatible. To do so, the design difference captioning tool 132 determines whether selected augmentations are compatible. The selected augmentations are considered to be compatible with one another if the perturbation made by a first augmentation is not affected by the perturbation made by a second augmentation. For example, Move Title top-right and Increase Title Font are compatible with one another because the Title will be moved to the top-right of the slide and the font of the title will be increased after applying these selected augmentations. However, Move Title top-right and Swap Title and Body are incompatible because the title will not be positioned at the top-right of the slide after applying these selected augmentations.

Subsequently, at 410, the design difference captioning tool 132 applies the selected augmentations to the sample slides to create perturbed slides.

At 412, the design difference captioning tool 132 generates a plurality of slide pairs by combining the sample slides and the perturbed slides. In other words, each slide pair includes a sample slide and a perturbed slide, which was created by applying one or more augmentations to the sample slide.

Subsequently, at 414 shown in FIG. 4B, the design difference captioning tool 132 filters the plurality of slide pairs to exclude one or more slide pairs that are visually the same. It should be appreciated that not all combinations of augmentations result in visually different slides. For example, a slide that has its title center aligned will show no change after undergoing Align Title center augmentation.

As a result, at 416, the design difference captioning tool 132 generates synthetic design dataset that includes the filtered slide pairs and one or more classes of augmentations (i.e., one or more perturbation) associated with each the filtered slide pair. In other words, the synthetic design dataset includes the filtered slide pairs and one or more augmentations that have been applied to create the corresponding filtered slide pair.

Subsequently, at 418, the design difference captioning tool 132 trains a predictive model as multi-label classification using the synthetic design dataset. In the illustrative embodiment, the predictive model is an image encoder.

At 420, the design difference captioning tool 132 evaluates the trained predictive model to estimate accuracy in predicting one or more predicted augmentations. An example method of training and evaluating the predictive model is described further below.

Figure 5:
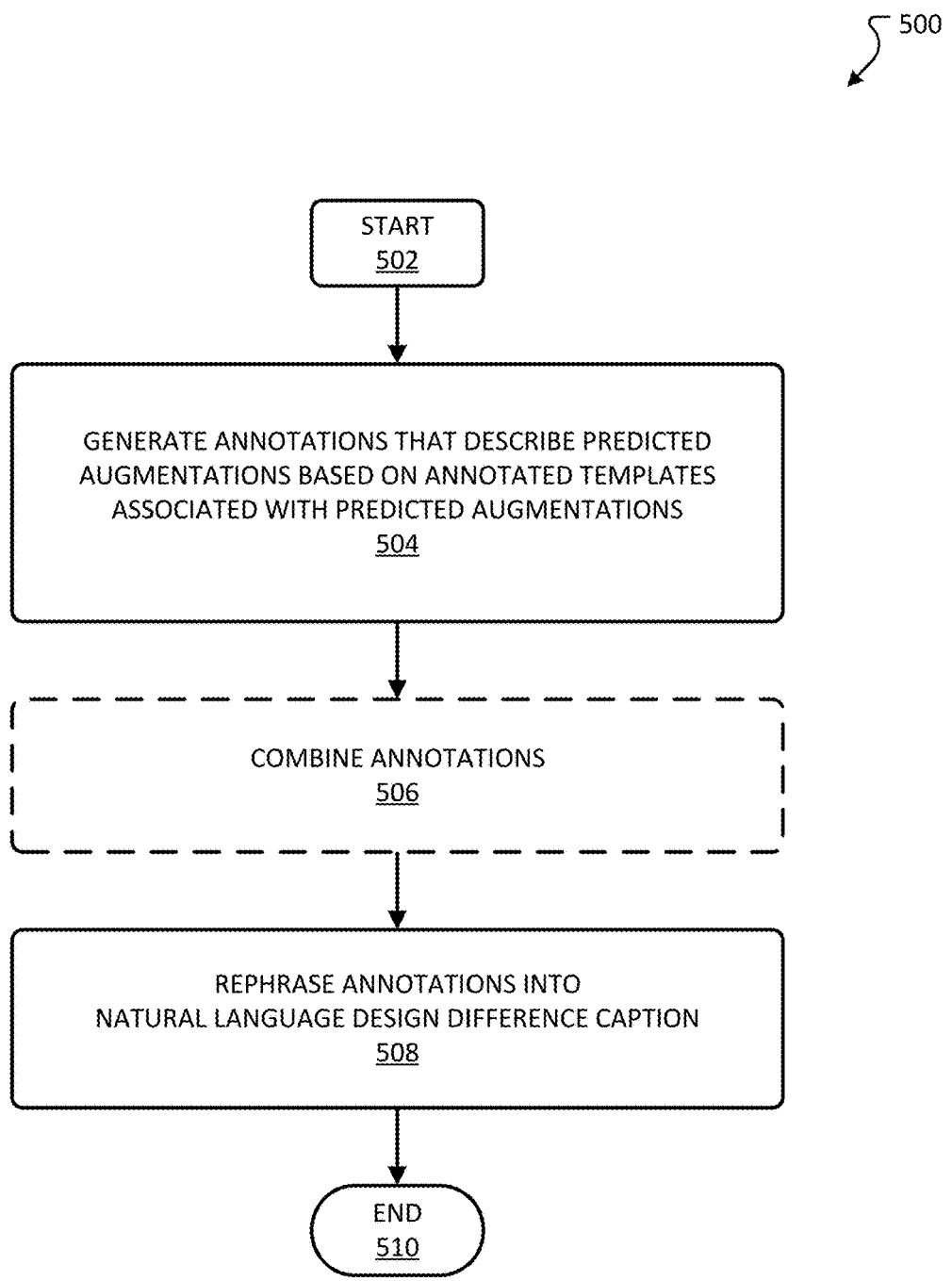
FIG. 5 depicts a flowchart of an example method of generating the design difference captions indicative of layout differences between a pair of designed slides in accordance with examples of the present disclosure.

Referring now to FIG. 5, a method 500 for generating the design difference captions indicative of one or more layout differences between a pair of designed slides in accordance with examples of the present disclosure is provided. Generally, the method 500 illustrates a sequence of operations for generating the design difference captions 210 of FIG. 2. A general order for the steps of the method 500 is shown in FIG. 5. Generally, the method 500 starts at 502 and ends at 510. The method 500 may include more or fewer steps or may arrange the order of the steps differently than those shown in FIG. 5.

In the illustrative aspect, the method 500 is performed by a computing device (e.g., a user device 120) of a user 110. However, it should be appreciated that one or more steps of the method 500 may be performed by another device (e.g., a server 160). Specifically, in some aspects, the method 500 may be performed by design difference captioning tool (e.g., 132) of an productivity application (e.g., 130). For example, the productivity application 130 may be Microsoft® PowerPoint® or any other productivity application executed on the computing device 120. More specifically, the method 500 may be performed by a design difference caption generator (e.g., 140) of the design difference captioning tool 132. The method 500 can be executed as a set of computer-executable instructions executed by a computer system and encoded or stored on a computer readable medium. Further, the method 500 can be performed by gates or circuits associated with a processor, an ASIC, an FPGA, a SOC or other hardware device. Hereinafter, the method 500 shall be explained with reference to the systems, components, modules, software, data structures, user interfaces, etc. described in conjunction with FIG. 1 and FIGS. 7-9.

The method 500 starts at 502, where flow may proceed to 504. At 504, the design difference caption generator 140 generates annotations that describe one or more predicted augmentations (from step 208 of FIG. 2) based on annotated templates associated with the one or more predicted augmentations. In some aspects, if there are more than one predicted augmentation, the design difference caption generator 140 combines the annotations for each of the predicted augmentations at 506. For example, suppose the predicted augmentations include Move Title top-right and Align Title left, then the design difference caption generator 140 will sample human annotations from each of these augmentation class as The title is moved to the top-right location and The title text is left-aligned.

Subsequently, at 508, the design difference caption generator 140 rephrases the annotations into a natural language design difference caption that describes one or more layout differences between a pair of designed slides. Using the same example above, both of the annotations will be rephrased by the design difference caption generator 140 into a natural language caption, such as, The title is moved to top-right location while its text was aligned to the left.

Exemplary Method (1) Data Generation Pipeline

To provide an example, in the illustrative embodiment, 19 layout augmentations are identified to be applied to a sample slide to create a perturbed slide with subtle layout change while keeping the rest of the design element the same. For example, the layout augmentations that are commonly used by the users include Change text alignment, Move text boxes, Change in font size, and Swap title and body augmentations. The perturbed slides are generated by applying these augmentations independently on both Title and Subtitle text boxes of each sample slide.

Text Alignment. This augmentation changes the horizontal alignment of the text within its text box. Three values of text alignment were considered: left, right, and center. Justify alignment was removed because it was not creating any visual change in the slide. As such, there is 3×2=6 permutations of augmentations in total from Text Alignment.

Move Text Box. Quite often the Title and Subtitle boxes are moved around on a slide. These perturbations are captured by Move text boxes augmentation. A sample text box was moved to any of the four corners, dubbed as top-left, top-right, bottom-left, and bottom-right. This movement of text boxes can be done on both Title and Subtitle individually and hence results in 4×2=8 augmentations.

Font Size. In this augmentation, the font size of the text is increased or decreased. It creates 2×2=4 augmentations in total.

Swap Title and Body. One of the common layout changes in the productivity application (e.g. 130) is exchange of positions of title and body text boxes.

In the illustrative embodiment, the 19 layout augmentations include align content center, align title center, align content left, align title left, align content right, align title right, font content decrease, font title decrease, font content increase, font title increase, move content bottom-left, move title bottom-left, move content bottom-right, move title bottom-right, move content top-left, move title top-left, move content top-right, move title top-right, and swap title body. Theoretically, an endless number of layout perturbed slides may be generated using the productivity application (e.g. 130) by repeatedly querying an API associated with the productivity application 130.

The synthetic design dataset (SynD) in the example has 83,898 slide pairs and was generated by applying 158 compatible augmentation combinations on 531 sample slides in a self-supervised manner. Each of the augmentation combinations include at most two augmentations that were selected to be applied on each sample slide. However, it should be appreciated that any number of augmentations may be applied to a sample slide to create a perturbed slide.

It should also be appreciated that not all combinations of augmentations result in a visually different slide. For example, a slide that has its title center aligned will show no change after undergoing Align Title center augmentation. As such, after filtering the synthetic design dataset, the remaining 82,260 slide pairs may be used to teach the predictive model (e.g., for training and/or validating) to predict subtle layout changes between a pair of slides.

It should be appreciated that the synthetic design dataset is used for training the predictive model for modeling the multi-label classification task while the validation split is used to select the model. The human annotated templates required for sampling annotations for predicted classes has 6 annotations for each 19 augmentations. Further, we benchmark all the methods against a 46 slide pair set which has three human annotations per example.

(2) Training Pipeline

Solving a complex dataset like SynD requires a predictive model that can capture subtle changes in the layout while also incorporating a generative machine learning model that can generate captions without labeled captions. In the illustrative embodiment, only the predictive model is trained using the synthetic design dataset to learn the subtle layout changes between the pair of slides. The generative machine learning model is not trained since there is no labeled captions. Rather, as described above and further below, the generative machine learning model samples the human annotation for each class of augmentation and rephrase them in a natural language caption. However, in some aspects, the generative machine learning model may be trained with data similar to labeled captions.

Predictive Model

One of the goals of the predictive model is to learn the subtle layout change in the slide data. As described above, the predictive model may be an image encoder (e.g., ResNext-101 image encoder). In this exemplary embodiment, a Siamese network setup for the image encoder is used to compare the two input slide data. It takes in two slide images $i_1$ and $i_2$ which pass through the image encoder $f_\theta$ to generate latent embeddings $g_1$ and $g_2$. These latent embeddings are then concatenated and passed to a linear network $f_\varphi$ which outputs the predicted probabilities h for the 19 possible augmentations y. The complete network is trained using Binary-Cross-Entropy loss as it is designed to solve a Multi-label classification problem.

$$g_1, g_2 = f_\theta(i_1), f_\theta(i_2) \quad (1)$$

$$h = f_\varphi(g_1 \cdot g_2) \quad (2)$$

$$\mathcal{L} = BCE(h, y) \quad (3)$$

Some advantages of training the predictive model as multilabel classification include decrease in the number of potential single class labels that can arise from combining more than one augmentation and computational viability of scaling to new layout augmentation classes.

Generative Machine Learning Model

After training the predictive model, the model weights are frozen and queried for design difference prediction. Accordingly, for each predicted augmentation, an annotated template from a set of human annotations is used as a model to generate a design difference caption. To do so, a set of 6 annotations for each augmentation class is constructed. This results in a total of 114 annotations for 19 augmentation classes. It should be appreciated that, because of the size of the annotations, the quality of these annotations can be controlled precisely.

One sampled annotation for each predicted class of augmentation is passed through a generative machine learning model, such as a text decoder (e.g., a generative machine learning model, such as the Generative Pre-trained Transformer 3 (GPT-3)), which is prompted to combine each annotation sentence and rephrase them in a natural language caption. For example, suppose the predictive model predicted Move Title top-right and Align Title left, then the generative machine learning model will sample human annotations from each of these augmentation class as The title is moved to the top-right location and The title text is left-aligned. Both of these annotations will then be rephrased by the generative machine learning model into a natural language caption, such as, The title is moved to top-right location while its text was aligned to the left.

By utilizing the annotated templates, it not only decreases the amount of labelling required for the design difference captioning problem but also allows for scalability for newer transformations in future. It should be appreciated that, in this example, the annotated templates are created by human. However, in some aspects, the annotated templates may be obtained by other means.

(3) Experiments

Implementation details. An ImageNet pre-trained ResNext-101 encoder is used. The 2048-dim feature output from ResNext-101 is reduced to 512 by replacing the last linear layer. The concatenated 1024-dim feature vector is passed to a two-layer linear network of 1024 and 512 dimensions respectively, before the logit output for SynD classes. The predictive model is trained using a SGD optimizer for a learning rate of 0.1, momentum value of 0.9, and weight decay of 1e–6.

Baselines. Even though design difference description problem does not have any existing baseline, existing state-of-the-art image difference captioning methods for the task has been modified to evaluate the performance of the design difference captioning method disclosed herein. Existing works require labelled data for training but SynD does not include any labelled captions. To solve this problem, extra data is provided to the baselines in the form of human annotated captions. For each augmentation class, its corresponding class-specific annotations from the human annotation set are provided. Thus, each image pair would have 6 or 12 captions mimicking the training criteria of these baselines. Moreover, one of the baselines, $R^3Net+SSP$ requires additional supervision in the form of keywords that semantically represents changes in the dataset, for example, title, increase, and/or align.

Evaluation Metrics. The Microsoft® COCO caption evaluation method was used for evaluating generated caption fluency and its proximity to the ground truth. BLEU, METEOR, CIDEr, and SPICE scores on a test set across all the methods and evaluations are reported. It should be appreciated that there is no overlap between the test set and SynD dataset.

(4) Results on SynD Dataset

The performance of the design difference captioning method is evaluated using various evaluation tools to help empirically understand the strength of the design difference captioning method and the SynD dataset.

Comparison to prior approaches. The design difference captioning method was compared against number of baselines. As shown in Table 1 below, the design difference captioning method consistently outperform the baselines over all image captioning metrics. There is a significant improvement of almost 0.065 BLEU-4, 0.073 METEOR and 0.084 SPICE scores over the baselines. Further, the design difference captioning method was able to outperform transformer-based baseline CLIP4IDC while using a CNN based backbone. It not only depicts the complexity of the Design Description problem but also shows that the design difference captioning method is able to learn difference captions without an end-to-end training. By training the predictive model separately from the generative machine learning model, the performance of each part of the pipeline was evaluated and quantified.

TABLE 1

| Methods | BLEU_1 | BLEU_2 | BLEU_3 | BLEU_4 | METEOR | ROUGE_L | CIDEr | SPICE |
| --- | --- | --- | --- | --- | --- | --- | --- | --- |
| DUDA | 0.325 | 0.195 | 0.106 | 0.061 | 0.124 | 0.321 | 0.119 | 0.153 |
| $R^3Net$ + SSP | 0.376 | 0.242 | 0.15 | 0.093 | 0.151 | 0.374 | 0.189 | 0.181 |
| CLIP4IDC | 0.36 | 0.237 | 0.17 | 0.125 | 0.156 | 0.410 | 0.351 | 0.096 |

TABLE 1-continued

| Methods | BLEU_1 | BLEU_2 | BLEU_3 | BLEU_4 | METEOR | ROUGE_L | CIDEr | SPICE |
|---|---|---|---|---|---|---|---|---|
| Design Difference Captioning | 0.506 | 0.36 | 0.249 | 0.18 | 0.229 | 0.421 | 0.362 | 0.265 |

Figure 6A:
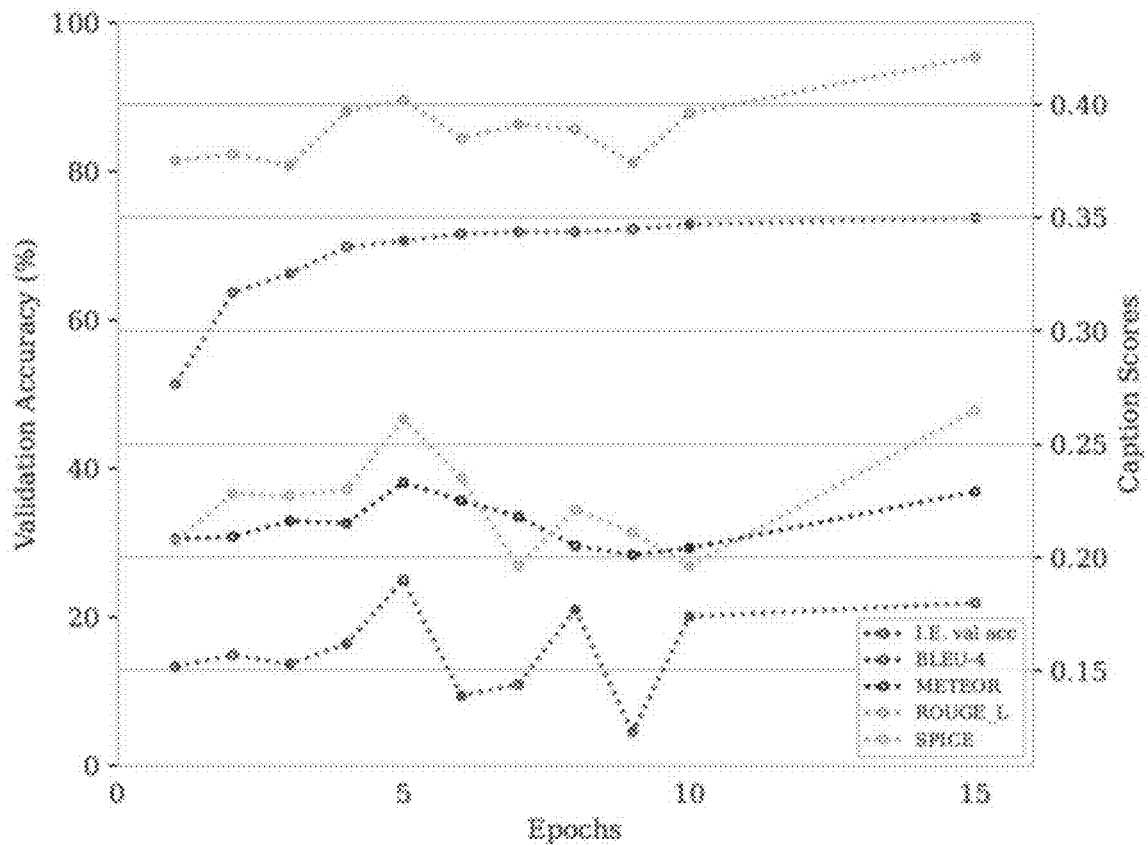
FIG. 6A depicts a graphical representation of an example of validation accuracy on synthetic design dataset in accordance with examples of the present disclosure.
Figure 6B:
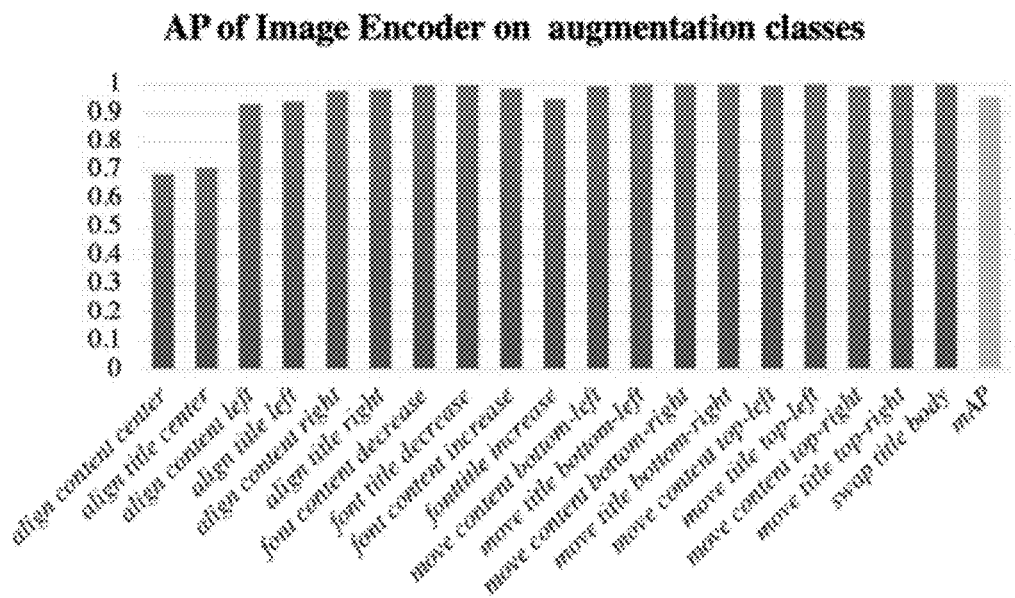
FIG. 6B depicts a graphical representation of an example of average precision of predictive model across different augmentation classes in accordance with examples of the present disclosure.

Effect of Image Encoder on captioning. One of the strength of the design difference captioning method is the separate optimization of the predictive model. As such, the effect of the predictive model validation accuracy on the SynD dataset over its captioning performance was evaluated. FIG. 6A illustrates an empirical correlation between validation accuracy and caption scores. As shown in FIG. 6, there is a steady increase in SPICE scores as the validation accuracy improves from 51.4% to 73.7%, the SPICE score improves from 0.207 to 0.265. In other words, improving the performance of the predictive model improves the captioning performance of the generative machine learning model. As the predictive model improves its representations for detecting subtle changes, it directly affects the sampling of human annotations which automatically improves generated captions. It should be appreciated that the reported validation accuracy is exact label match accuracy in a multi-label classification problem.

Effect of different augmentations. To systematically study the effect of the augmentation classes, the SynD was evaluated using leave-one-augmentation-out evaluation. As depicted in Table 2, the lowest performance drop of 0.066 SPICE score was observed when Text Alignment augmentation was removed. This may be due to the fact that Text Alignment augmentation is the most subtle change across all the four augmentations, it may have been challenging for the predictive model to learn it. This is further observed more concretely in the FIG. 6B, where performance of alignment augmentation classes is generally lower compared to performance of move augmentation classes. Specifically, align center title and align center subtitle have the lowest average precision (AP) scores of 68% and 69%, respectively. This may be because default layout often comes with center aligned text, performing these augmentations result in visually same image. Hence, these two classes are most filtered out during data preparation. Font Size seems to be a common augmentation as the largest drop in performance was observed when it is left out. This may be due to the fact that the font size changes always result in visual change and are least likely to be occluded by an existing image on the slide, making it the most informative augmentation.

TABLE 2

| w/o Aug | BLEU_4 | METEOR | ROUGE_L | CIDEr | SPICE |
|---|---|---|---|---|---|
| Text Alignment | 0.183 | 0.199 | 0.342 | 0.311 | 0.199 |
| Swap | 0.124 | 0.169 | 0.256 | 0.215 | 0.141 |
| Font Size | 0.113 | 0.137 | 0.297 | 0.232 | 0.101 |
| Move Text Box | 0.126 | 0.163 | 0.333 | 0.241 | 0.193 |

Figure 7:
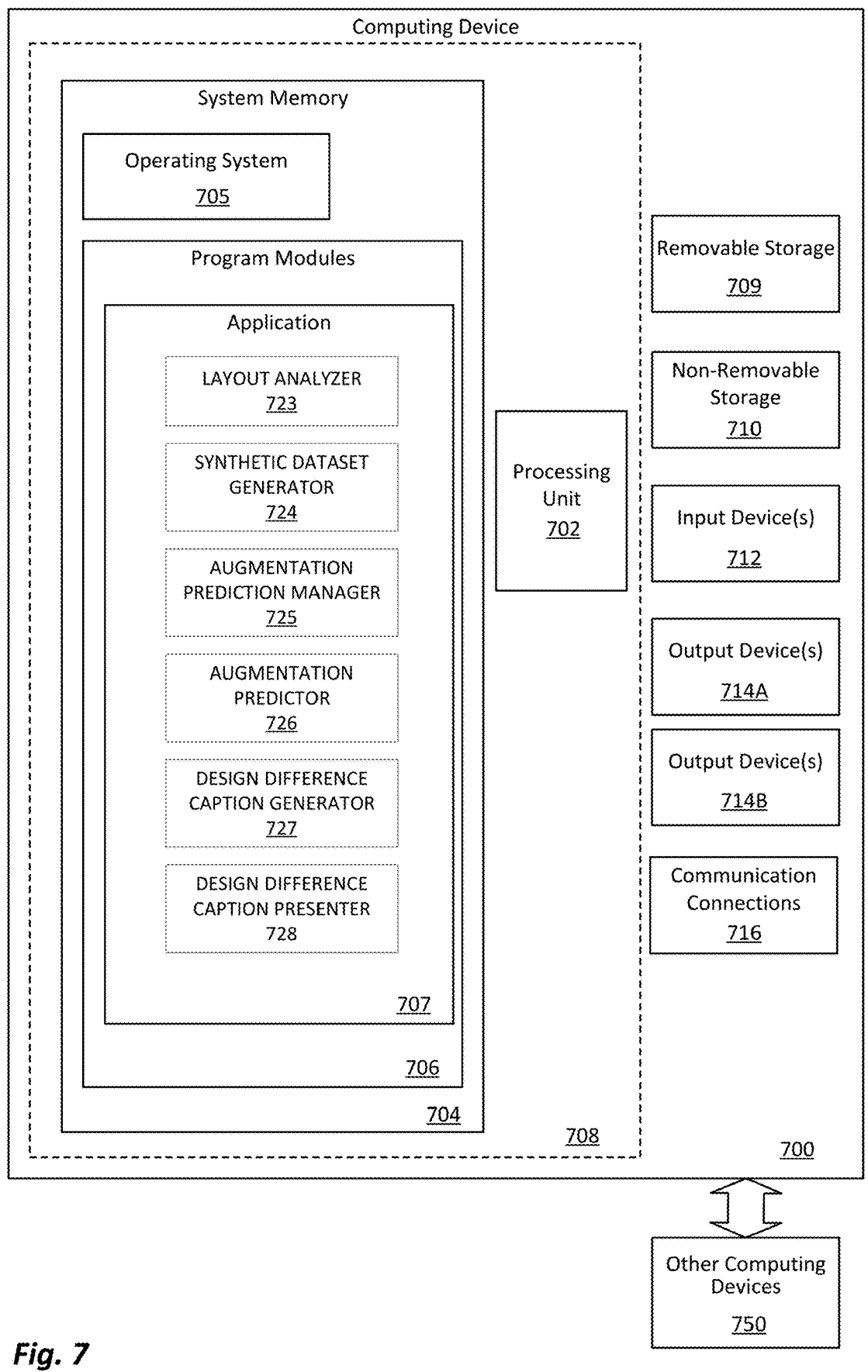
FIG. 7 depicts a block diagram illustrating physical components (e.g., hardware) of a computing device with which aspects of the disclosure may be practiced.
Figure 8:
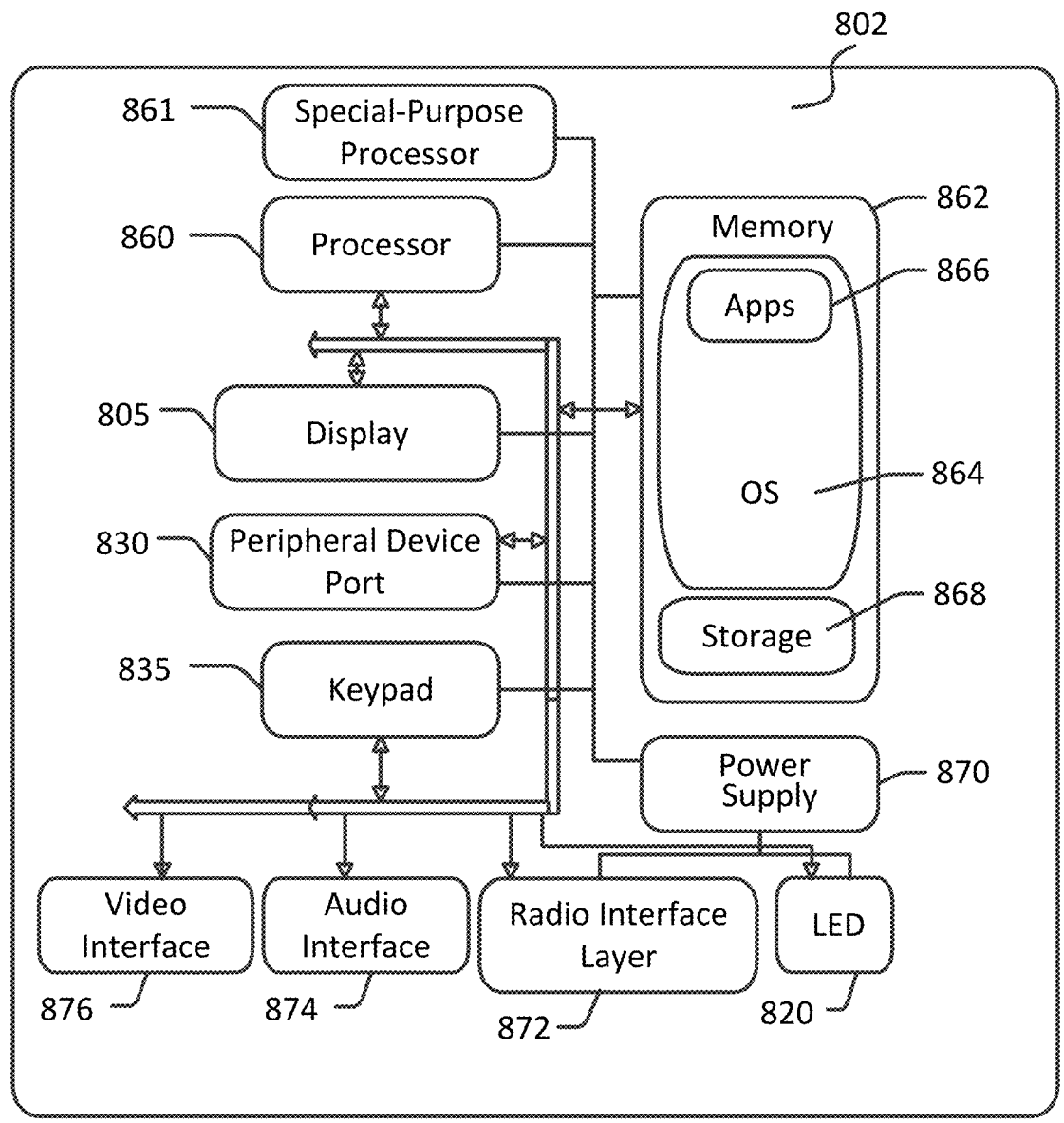
FIG. 8 illustrates an example of a computing device with which aspects of the disclosure may be practiced.
Figure 9:
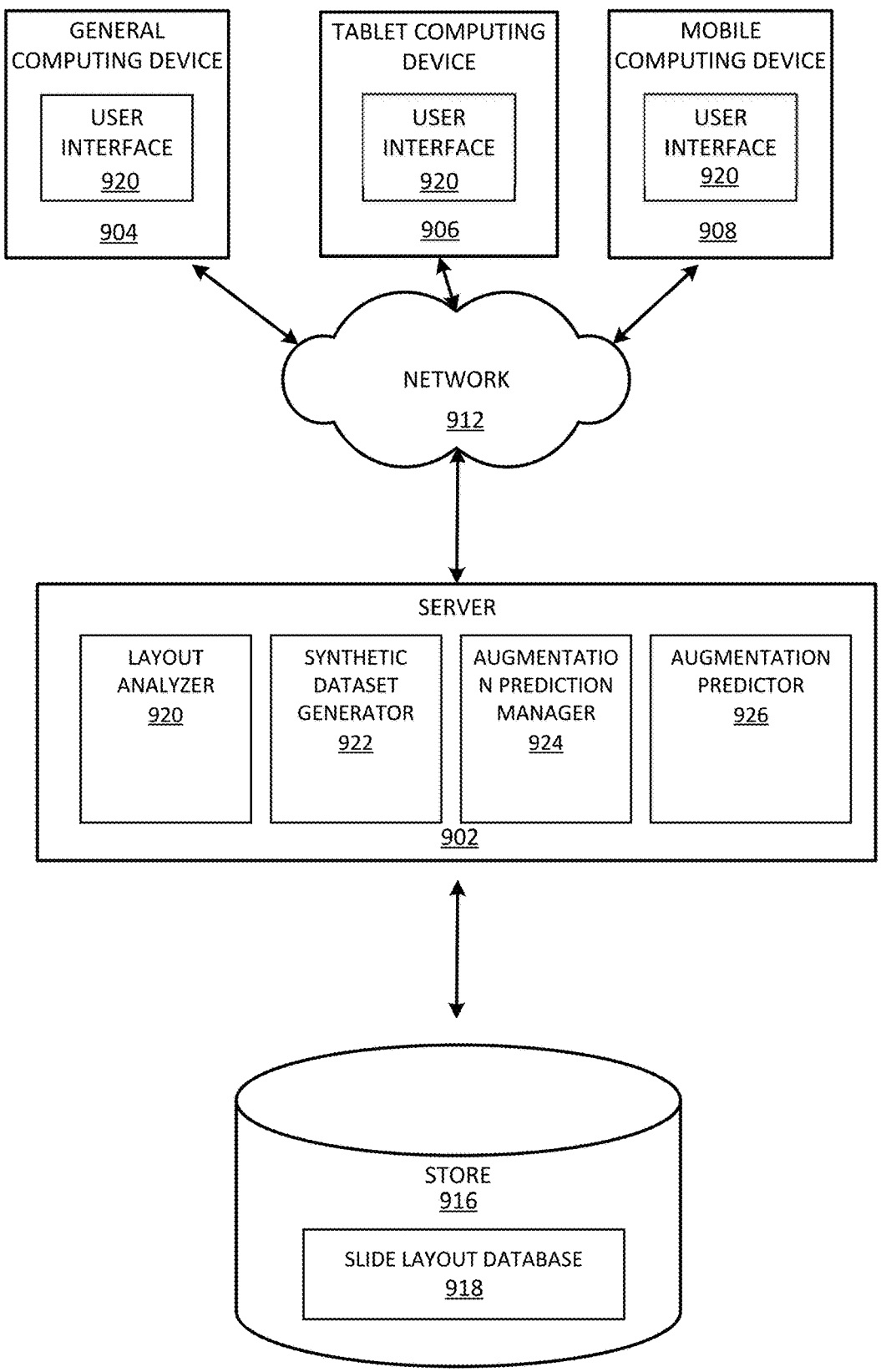
FIG. 9 illustrates at least one aspect of an architecture of a system for processing data in accordance with examples of the present disclosure.

FIGS. 7-9 and the associated descriptions provide a discussion of a variety of operating environments in which aspects of the disclosure may be practiced. However, the devices and systems illustrated and discussed with respect to FIGS. 7-9 are for purposes of example and illustration and are not limiting of a vast number of computing device configurations that may be utilized for practicing aspects of the disclosure, described herein.

FIG. 7 is a block diagram illustrating physical components (e.g., hardware) of a computing device 700 with which aspects of the disclosure may be practiced. The computing device components described below may be suitable for the computing devices described above. For example, the computing device 700 may represent the computing device 120 of FIG. 1. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories.

The system memory 704 may include an operating system 705 and one or more program modules 706 suitable for performing the various aspects disclosed herein such. The operating system 705, for example, may be suitable for controlling the operation of the computing device 700. Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, several program modules and data files may be stored in the system memory 704. While executing on the at least one processing unit 702, the program modules 706 may perform processes including, but not limited to, one or more aspects, as described herein. The application 707 includes a layout analyzer 723, a synthetic dataset generator 724, an augmentation prediction manager 725, an augmentation predictor 726, a design difference caption generator 727, and a design difference caption presenter 728, as described in more detail with regard to FIG. 1. Other program modules that may be used in accordance with aspects of the present disclosure may include electronic mail and contacts applications, word processing applications, spreadsheet applications, database applications, slide presentation applications, drawing or computer-aided application programs, etc., and/or one or more components supported by the systems described herein.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The computing device 700 may also have one or more input device(s) 712 such as a keyboard, a mouse, a pen, a sound or voice input device, a touch or swipe input device, etc. The output device(s) 714A such as a display, speakers, a printer, etc. may also be included. An output 714B, corresponding to a virtual display may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIG. 8 is a block diagram illustrating the architecture of one aspect of computing device, a server, or a mobile computing device. That is, the mobile computing device 800 can incorporate a system 802 (e.g., an architecture) to implement some aspects. The system 802 can implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and/or one or more components supported by the systems described herein. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein (e.g., a layout analyzer 723, a synthetic dataset generator 724, an augmentation prediction manager 725, an augmentation predictor 726, a design difference caption generator 727, a design difference caption presenter 728, etc.).

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated configuration, the visual indicator 820 is a light emitting diode (LED) and the audio transducer 825 is a speaker. These devices may be directly coupled to the power supply 870 so that when activated, they remain on for a duration dictated by the notification mechanism even though the processor 860/861 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with aspects of the present disclosure, the microphone may also serve as an audio sensor to facilitate control of notifications, as will be described below. The system 802 may further include a video interface 876 that enables an operation of an on-board camera to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

FIG. 9 illustrates one aspect of the architecture of a system for processing data received at a computing system from a remote source, such as a personal computer 904, tablet computing device 906, or mobile computing device 908, as described above. Content displayed at server device 902 may be stored in different communication channels or other storage types. For example, the computing device 904, 906, 908 may represent the computing device 120 of FIG. 1, and the server device 902 may represent the server 160 of FIG. 1.

In some aspects, one or more of a layout analyzer 920, a synthetic dataset generator 922, an augmentation prediction manager 924, and an augmentation predictor 926, may be employed by server device 902. The server device 902 may provide data to and from a client computing device such as a personal computer 904, a tablet computing device 906 and/or a mobile computing device 908 (e.g., a smart phone) through a network 912. By way of example, the computer system described above may be embodied in a personal computer 904, a tablet computing device 906 and/or a mobile computing device 908 (e.g., a smart phone). Any of these aspects of the computing devices may obtain content from the store 916, in addition to receiving graphical data useable to be either pre-processed at a graphic-originating system, or post-processed at a receiving computing system. The content store may include slide layout database 918.

FIG. 9 illustrates an exemplary mobile computing device 908 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits several known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

Several variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

In accordance with at least one example of the present disclosure, a method for generating a design difference caption is provided. The method may include receiving, by a productivity application, a first slide with a first layout, identifying a first set of elements included in the first layout, determining first characteristics associated with the first set of elements, receiving a second slide with a second layout, identifying a second set of elements included in the second layout, determining second characteristics associated with the second set of elements, determining, using a predictive model, one or more predicted augmentations indicative of one or more layout differences between the first slide and the second slide based on the first characteristics and the second characteristics, generating, using a generative machine learning model, a design difference caption based on the one or more predicted augmentations and one or more annotated templates, the design difference caption including a description of one or more layout differences between the first slide and the second slide, the one or more annotated templates including annotations for the one or more predicted augmentation, and providing, by the productivity application, the design difference caption.

In accordance with at least one aspect of the above method, the method may include where the design difference caption is in natural language that provides a concise description of the one or more layout differences between the first and second slides.

In accordance with at least one aspect of the above method, the method may include where the one or more predicted augmentations indicate a presence of one or more augmentations based on the one or more layout differences between the first and second slides.

In accordance with at least one aspect of the above method, the method may include where the one or more predicted augmentations include a predicted probability of the likelihood of the presence of the respective augmentation.

In accordance with at least one aspect of the above method, the method may further include determining a common set of elements between the first set of elements and the second set of elements.

In accordance with at least one aspect of the above method, the method may include where generating the design difference caption based on the one or more predicted augmentations and one or more annotated templates comprises generating, using the generative machine learning model, one or more annotations that describe the one or more predicted augmentations based on the one or more annotated templates associated with the one or more predicted augmentations, and rephrasing, using the generative machine learning model, the one or more annotations into a natural language design difference caption.

In accordance with at least one aspect of the above method, the method may further include training the predictive model as multi-label classification using synthetic design dataset, and evaluating the trained predictive model to estimate accuracy in predicting the one or more predicted augmentations.

In accordance with at least one aspect of the above method, the method may include where training the predictive model using the synthetic design dataset includes obtaining a plurality of sample slides with various layouts, obtaining a plurality of augmentations, each of the plurality of augmentations indicative of a class of perturbation applicable to the plurality of sample slides, selecting one or more augmentations from the plurality of augmentations that are compatible with each other, applying the selected augmentations to the plurality of sample slides to create a plurality of perturbed slides, generating a plurality of slide pairs by combining the plurality of sample slides and the plurality of perturbed slides, filtering one or more slide pairs of the plurality of slide pairs that are visually the same, and generating or updating the synthetic design dataset including the filtered slide pairs and one or more classes of perturbation that are associated with each of the filtered slide pairs.

In accordance with at least one aspect of the above method, the method may include where the plurality of augmentations includes change text alignment, move text boxes, change font size, and swap title and body augmentation.

In accordance with at least one aspect of the above method, the method may include where the first set of elements includes a title, a subtitle, and/or text boxes and the first characteristics include location, size, color, and/or shape associated with the first set of elements.

In accordance with at least one aspect of the above method, the method may include where providing the design difference caption includes displaying the design difference caption on a graphical user interface in a text format, and/or playing the design difference caption in an audio format.

In accordance with at least one example of the present disclosure, a computing device for generating a design difference caption is provided. The computing device may include a processor and a memory having a plurality of instructions stored thereon that, when executed by the processor, causes the computing device to receive a plurality of sample slides with various layouts, receive a plurality of augmentations, each of the plurality of augmentations indicative of a class of perturbation applicable to the plurality of sample slides, select one or more augmentations from the plurality of augmentations that are compatible with each other, apply the selected augmentations to the plurality of sample slides to create a plurality of perturbed slides, generate a plurality of slide pairs by combining the plurality of sample slides and the plurality of perturbed slides, filter one or more slide pairs of the plurality of slide pairs that are visually the same, generate or update the synthetic design dataset including the filtered slide pairs and one or more classes of perturbation that are associated with each of the filtered slide pairs, and train a predictive model as multi-label classification using synthetic design dataset for predicting one or more predicted augmentations, the one or more predicted augmentations indicative of one or more layout differences between a pair of slides.

In accordance with at least one aspect of the above computing device, the computing device may be configured to receive a first slide with a first layout, identify a first set of elements included in the first layout, determine first characteristics associated with the first set of elements, receive a second slide with a second layout, identify a second set of elements included in the second layout, determine second characteristics associated with the second set of elements, generate determining, using the predictive model, one or more predicted augmentations indicative of one or more layout differences between the first slide and the second slide based on the first characteristics and the second characteristics, generate, using a generative machine learning model, a design difference caption based on the one or more predicted augmentations and one or more annotated templates, the design difference caption including a description of one or more layout differences between the first slide and the second slide, the one or more annotated templates including annotations for the one or more predicted augmentation, and provide the design difference caption.

In accordance with at least one aspect of the above computing device, the computing device may include where to generate the design difference caption based on the one or more predicted augmentations and one or more annotated templates comprises to generate, using the generative machine learning model, one or more annotations that describe the one or more predicted augmentations based on the one or more annotated templates associated with the one or more predicted augmentations, and rephrase, using the generative machine learning model, the one or more annotations into a natural language design difference caption that provides a concise description of the one or more layout differences between the first and second slides.

In accordance with at least one aspect of the above computing device, the computing device may include where to provide the design difference caption comprises to display the design difference caption on a graphical user interface in a text format, and/or play the design difference caption in an audio format.

In accordance with at least one example of the present disclosure, a non-transitory computer-readable medium storing instructions for generating a design difference caption, the instructions when executed by one or more processors of a computing device, cause the computing device to receive a first document, identify a first set of elements included in the first layout, determine first characteristics associated with the first set of elements, receive a second document with a second layout, identify a second set of elements included in the second layout, determine second characteristics associated with the second set of elements, generate, using a predictive model, one or more predicted augmentations indicative of one or more layout differences between the first document and the second document based on the first characteristics and the second characteristics, generate, using a generative machine learning model, a design difference caption based on the one or more predicted augmentations and one or more annotated templates, the design difference caption including a description of one or more layout differences between the first document and the second document, the one or more annotated templates including annotations for the one or more predicted augmentation, and provide, by the productivity application, the design difference caption.

In accordance with at least one aspect of the above non-transitory computer-readable medium, the instructions when executed by one or more processors of a computing device may include where to generate the design difference caption based on the one or more predicted augmentations and one or more annotated templates comprises to generate, using the generative machine learning model, one or more annotations that describe the one or more predicted augmentations based on the one or more annotated templates associated with the one or more predicted augmentations, and rephrase, using the generative machine learning model, the one or more annotations into a natural language design difference caption.

In accordance with at least one aspect of the above non-transitory computer-readable medium, the instructions when executed by the one or more processors may further cause the computing device to train the predictive model as multi-label classification using synthetic design dataset, and evaluate the trained predictive model to estimate accuracy in predicting the one or more predicted augmentations.

In accordance with at least one aspect of the above non-transitory computer-readable medium, the instructions when executed by one or more processors of a computing device may include where to train the predictive model using the synthetic design dataset includes to obtain a plurality of sample documents with various layouts, obtain a plurality of augmentations, each of the plurality of augmentations indicative of a class of perturbation applicable to the plurality of sample documents, select one or more augmentations from the plurality of augmentations that are compatible with each other, apply the selected augmentations to the plurality of sample documents to create a plurality of perturbed documents, generate a plurality of document pairs by combining the plurality of sample documents and the plurality of perturbed documents, filter one or more document pairs of the plurality of document pairs that are visually the same, and generate or update the synthetic design dataset including the filtered document pairs and one or more classes of perturbation that are associated with each of the filtered document pairs.

In accordance with at least one aspect of the above non-transitory computer-readable medium, the instructions when executed by one or more processors of a computing device may include where to provide the design difference caption includes display the design difference caption on a graphical user interface in a text format, and/or play the design difference caption in an audio format.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

The invention claimed is:

1. A method for generating a design difference caption, the method comprising:
   receiving, by a productivity application, a first slide with a first layout;
   identifying a first set of elements included in the first layout;
   determining first characteristics associated with the first set of elements;
   receiving a second slide with a second layout;
   identifying a second set of elements included in the second layout;
   determining second characteristics associated with the second set of elements;
   determining, using a multi-label predictive model, one or more predicted augmentations indicative of one or more layout differences between the first slide and the second slide based on the first characteristics and the second characteristics;
   generating, using a generative machine learning model, a design difference caption based on the one or more predicted augmentations and one or more annotated templates, the design difference caption including a description of one or more layout differences between the first slide and the second slide, the one or more annotated templates including annotations for the one or more predicted augmentation; and
   providing, by the productivity application, the design difference caption,
   wherein the multi-label predictive model was trained to perform multi-label classification using a dataset generated based on a plurality of sample slides with various layouts and a plurality of perturbed slides created by applying augmentations to the plurality of sample slides.

2. The method of claim 1, wherein the design difference caption is in natural language that provides a concise description of the one or more layout differences between the first and second slides.

3. The method of claim 1, wherein the one or more predicted augmentations indicate a presence of one or more augmentations based on the one or more layout differences between the first and second slides.

4. The method of claim 3, wherein the one or more predicted augmentations include a predicted probability of the likelihood of the presence of the respective augmentation.

5. The method of claim 1, further comprising determining a common set of elements between the first set of elements and the second set of elements.

6. The method of claim 1, wherein generating the design difference caption based on the one or more predicted augmentations and one or more annotated templates comprises:
   generating, using the generative machine learning model, one or more annotations that describe the one or more predicted augmentations based on the one or more annotated templates associated with the one or more predicted augmentations, and
   rephrasing, using the generative machine learning model, the one or more annotations into a natural language design difference caption.

7. The method of claim 1, further comprising:
   training the predictive model as multi-label classification using the dataset; and
   evaluating the trained predictive model to estimate accuracy in predicting the one or more predicted augmentations.

8. The method of claim 7, wherein training the predictive model using the dataset includes:
   obtaining the plurality of sample slides with various layouts;
   obtaining a plurality of augmentations, each of the plurality of augmentations indicative of a class of perturbation applicable to the plurality of sample slides;
   selecting one or more augmentations from the plurality of augmentations that are compatible with each other;
   applying the selected augmentations to the plurality of sample slides to create the plurality of perturbed slides;
   generating a plurality of slide pairs by combining the plurality of sample slides and the plurality of perturbed slides;
   filtering one or more slide pairs of the plurality of slide pairs that are visually the same; and
   generating or updating the dataset including the filtered slide pairs and one or more classes of perturbation that are associated with each of the filtered slide pairs.

9. The method of claim 8, wherein the plurality of augmentations includes change text alignment, move text boxes, change font size, and swap title and body augmentation.

10. The method of claim 1, wherein the first set of elements includes a title, a subtitle, and/or text boxes and the first characteristics include location, size, color, and/or shape associated with the first set of elements.

11. The method of claim 1, wherein providing the design difference caption includes:
displaying the design difference caption on a graphical user interface in a text format; and/or
playing the design difference caption in an audio format.

12. A non-transitory computer-readable medium storing instructions for generating a design difference caption, the instructions when executed by one or more processors of a computing device, cause the computing device to:
receive a first document;
identify a first set of elements included in the first layout;
determine first characteristics associated with the first set of elements;
receive a second document with a second layout;
identify a second set of elements included in the second layout;
determine second characteristics associated with the second set of elements;
generate, using a multi-label predictive model, one or more predicted augmentations indicative of one or more layout differences between the first document and the second document based on the first characteristics and the second characteristics;
generate, using a generative machine learning model, a design difference caption based on the one or more predicted augmentations and one or more annotated templates, the design difference caption including a description of one or more layout differences between the first document and the second document, the one or more annotated templates including annotations for the one or more predicted augmentation; and
provide, by the productivity application, the design difference caption,
wherein the multi-label predictive model was trained to perform multi-label classification using a dataset generated based on a plurality of sample documents with various layouts and a plurality of perturbed documents created by applying augmentations to the plurality of sample documents.

13. The non-transitory computer-readable medium of claim 12, wherein to generate the design difference caption based on the one or more predicted augmentations and one or more annotated templates comprises to:
generate, using the generative machine learning model, one or more annotations that describe the one or more predicted augmentations based on the one or more annotated templates associated with the one or more predicted augmentations, and
rephrase, using the generative machine learning model, the one or more annotations into a natural language design difference caption.

14. The non-transitory computer-readable medium of claim 12, wherein the instructions when executed by the one or more processors further cause the computing device to
train the predictive model as multi-label classification using the dataset; and
evaluate the trained predictive model to estimate accuracy in predicting the one or more predicted augmentations.

15. The non-transitory computer-readable medium of claim 14, wherein to train the predictive model using the dataset includes to:
obtain the plurality of sample documents with various layouts;
obtain a plurality of augmentations, each of the plurality of augmentations indicative of a class of perturbation applicable to the plurality of sample documents;
select one or more augmentations from the plurality of augmentations that are compatible with each other;
apply the selected augmentations to the plurality of sample documents to create the plurality of perturbed documents;
generate a plurality of document pairs by combining the plurality of sample documents and the plurality of perturbed documents;
filter one or more document pairs of the plurality of document pairs that are visually the same; and
generate or update the dataset including the filtered document pairs and one or more classes of perturbation that are associated with each of the filtered document pairs.

16. The non-transitory computer-readable medium of claim 12, wherein to provide the design difference caption includes:
display the design difference caption on a graphical user interface in a text format; and/or
play the design difference caption in an audio format.

* * * * *